United States Patent
Shaffer et al.

(10) Patent No.: US 6,349,286 B2
(45) Date of Patent: *Feb. 19, 2002

(54) SYSTEM AND METHOD FOR AUTOMATIC SYNCHRONIZATION FOR MULTIMEDIA PRESENTATIONS

(75) Inventors: Shmuel Shaffer, Palo Alto; William Joseph Beyda, Cupertino, both of CA (US)

(73) Assignee: Siemens Information and Communications Network, Inc., Boca Raton, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/146,747

(22) Filed: Sep. 3, 1998

(51) Int. Cl.[7] .............................. G10L 21/04; H04B 1/66
(52) U.S. Cl. ..................... 704/503; 345/302; 709/247
(58) Field of Search .............................. 704/210, 215, 704/500, 502, 503, 504; 348/439, 845.3, 423; 341/59; 370/468, 465, 523; 709/247, 231; 345/302

(56) References Cited

U.S. PATENT DOCUMENTS

| | | | | |
|---|---|---|---|---|
| 4,280,192 A | * | 7/1981 | Moll ........................... | 704/504 |
| 4,412,306 A | * | 10/1983 | Moll ........................... | 704/504 |
| 5,333,299 A | | 7/1994 | Koval et al. ................ | 395/550 |
| 5,408,274 A | * | 4/1995 | Chang et al. ............... | 348/700 |
| 5,420,801 A | | 5/1995 | Dockter et al. ............. | 364/514 |
| 5,455,910 A | | 10/1995 | Johnson et al. ............. | 395/650 |
| 5,526,054 A | * | 6/1996 | Greenfield et al. ......... | 348/467 |
| 5,546,395 A | * | 8/1996 | Sharma et al. .............. | 704/219 |
| 5,553,222 A | | 9/1996 | Milne et al. ................ | 395/154 |
| 5,594,660 A | | 1/1997 | Sung et al. .................. | 364/514 |
| 5,621,660 A | * | 4/1997 | Chaddha et al. ............ | 704/222 |
| 5,623,483 A | | 4/1997 | Agrawal et al. ............ | 370/253 |
| 5,642,171 A | | 6/1997 | Baumgartner et al. ...... | 348/515 |
| 5,717,438 A | * | 2/1998 | Kim et al. ................... | 345/302 |
| 5,737,495 A | * | 4/1998 | Adams et al. ............... | 709/231 |
| 5,737,531 A | * | 4/1998 | Ehley .......................... | 709/208 |
| 5,748,842 A | | 5/1998 | Holmes et al. ............. | 395/2.79 |
| 5,819,215 A | * | 10/1998 | Dobson et al. ............. | 704/230 |
| 5,893,062 A | * | 4/1999 | Bhadkamkar et al. ...... | 704/270 |
| 5,999,985 A | * | 12/1999 | Sebestyen ................... | 709/247 |
| 6,026,097 A | * | 2/2000 | Voois et al. ................ | 370/468 |

(List continued on next page.)

OTHER PUBLICATIONS

Molloy et al., "A video codec chipset for wireless multimedia networking," IEEE Signal Processing Society Workshop on VLSI Signal Processing, pp. 381 to 390, Sep. 1995.*

Fan et al., "Segmentation and Classification of Multimedia Documents," 1992 IEEE International Workshop on Intelligent Signal Processing and Communication Systems, pp. 416 to 430, Mar. 1992.*

*Primary Examiner*—William Korzuch
*Assistant Examiner*—Martin Lerner

(57) ABSTRACT

The present invention relates to a system and method for automatic synchronization in multimedia presentations. According to an embodiment of the present invention, when a data stream is compressed, delay which would normally be compressed out is replaced by a delay token which indicates a length of time of the delay. When a data stream is decompressed and presented, the delay tokens may either be used or ignored. In particular, when data streams are presented together in a multimedia presentation the delay tokens may be used to synchronize the various data streams of the multimedia presentation. Otherwise, when data streams are presented alone without the other data streams of a multimedia presentation or are not part of a multimedia presentation, the delay tokens may be ignored. In such cases when the delay token is ignored, any data stream delay is simply skipped since there is no need to synchronize with other data streams.

25 Claims, 4 Drawing Sheets

U.S. PATENT DOCUMENTS 6,029,127 A * 2/2000 Delargy et al. ............. 704/215
6,038,238 A * 3/2000 Jokinen et al. ............. 370/523
6,038,529 A * 3/2000 Harada ...................... 704/215
6,055,495 A * 4/2000 Tucker et al. ................ 704/210
6,085,221 A * 7/2000 Graf ........................... 709/231

* cited by examiner

SYSTEM AND METHOD FOR AUTOMATIC SYNCHRONIZATION FOR MULTIMEDIA PRESENTATIONS

BACKGROUND OF THE INVENTION

The present invention relates to data streams. In particular, the present invention relates to compressing data streams and the presentation of decompressed data streams.

When information, such as audio, video, image or data, is sent by a transmitting system to a receiving system, the information is typically sent in a compressed format for reasons of efficiency and transmission speed. Frequently, one aspect of compression is the removal of silence or delay in the information. The information is also typically stored at the transmitting system and/or receiving system in a compressed format. When the information is received by the receiving system, the information is then typically decompressed for presentation to the intended user(s).

Many compression/decompression schemes exist for efficiently sending audio messages. When silence is encountered in an audio message to be transmitted, the silence is typically stripped out of the audio message, which may be compressed. Conventional audio compression/decompression schemes include Adaptive Differential Pulse Code Modulation (ADPCM), Motion Picture Expert Group (MPEG) audio compression, Global System for Mobile Communication (GSM), and G.723.

In video messages, image compression/decompression issues typically need to be addressed in order to overcome data rate and storage size issues created by full-motion video. For example, frame skipping can be used to avoid storing and transmitting repeated frames when there is no change in the video picture from one frame to the next. Conventional video compression/decompression techniques include run-length coding, Huffman coding, vector quantization, subcolor sampling, discrete cosine transform (DCT), delta frame change, and motion estimation.

If the information to be sent is first compressed, data transmission speed can be increased substantially. Many data types and files are easily compressed because of the repetitive nature of their contents. Data compression can be achieved in many different ways. One common method is to use a special shorthand notation for transmitting data. If a certain character is sent frequently, the data compression devices may send an abbreviated form of the character. Another method is to send only changes to the data. Other examples of data compression/decompression methods include V.42bis and Microcom Network Protocol 5 (MNP5), which work well for real-time compression of a stream of data. As another example, a data file such as a file for a PowerPoint® presentation may be compressed first with an algorithm such as that used in Zip files.

Although single media type (e.g., only video, only data, or only audio) messages can be easily compressed and decompressed for single media presentations to users, the compression and decompression of multimedia presentations can cause some synchronization problems at the receiving end. Multimedia presentations typically contain some combination of audio, video, image, and data. Modem presentation systems, which may include voicemail messaging systems, video conferencing systems, and data presentation systems such as electronic mail (e-mail), may combine these capabilities into a multimedia presentation system. Ideally, the multiple different media data streams of a multimedia presentation are stored separately and transmitted individually with compression, thus enabling the efficient compression of each media data stream using compression techniques optimal for the particular type of media data stream. This system would also permit use of an individual media data stream separate from the other media data streams in the multimedia presentation. However, such a system would experience multimedia synchronization problems. The advantages and disadvantages of such a system are illustrated using an exemplary multimedia presentation like a chief executive officer's (CEO's) speech to shareholders that may include a video, a set of still images such as a PowerPoint presentation, and audio. If only a portion of the multimedia presentation is desired to be reviewed, then a single media stream such as an audio clip of a chief executive officer's (CEO's) speech to shareholders can be downloaded to a branch office for later playback to employees. For transmission of that audio clip, the messaging system performs the most optimal compression (in this case, normal audio compression) and removes long gaps of silence from the message. Later if the branch manager decides he would prefer to receive the video version, he can separately download the video stream, which is stored in the messaging system, which is transmitted using the optimum video compression. Advantageously, the separately stored and transmitted media data streams of a multimedia presentation can be separately downloaded as needed without transmitting the entire multimedia presentation in order to view only one of the media data streams. However, when he plays back both video and audio together, the audio and video are no longer synchronized. Since the messages were stored and transmitted independently, this system optimizes its compression without regard to time synchronization. As gaps in the voice may have occurred while the CEO was making gestures captured on video, the two data streams when played back are no longer synchronized. If a third data stream, containing the slides presented by the CEO were downloaded, they would also have no synchronization information. The video and audio may not be synchronized when a delay, such as a pause, occurs in the video. Further, if the set of images, such as pie graphs, is shown during the video pause and the audio is not synchronized to the set of images, then the audio may continue to discuss the first image after the first image has been replaced by a second image. These types of synchronization problems can result in serious confusion and poor performance in multimedia messaging systems.

One possible solution to the multimedia synchronization problem is to time stamp each data packet in each simultaneously transmitted single media data stream of the multimedia presentation to allow for multimedia synchronization. In particular, when the various data streams of a multimedia presentation, such as the audio and video, are transmitted at the same time, most multimedia protocols typically use some form of time stamping to mark each packet of the information such that the audio and video can be synchronized later. By matching time stamps of the packets of each single media data stream, these time-matched packets can be simultaneously presented in a synchronized multimedia presentation.

However, this approach of time stamping each data packet for each data stream of a multimedia presentation may suffer from various problems. One problem is that time stamping, especially for audio portions of a multimedia presentation, typically involves high overhead. For example, in an audio portion of a multimedia message, the portion of a stored message that consists of time stamps could easily be greater than the silence removed from the audio message, demonstrating the potentially high overhead of time stamps in some situations. As a more specific illustration of the time stamp overhead problem, it is noted that for the typical 66-byte IP voice packet, 5–10% of the stored voice message might be time stamps; whereas, the typical voice message might only have 2–3% of the total message time compressed out of it due to silence removal. Thus, the storage of time stamped messages would result in a higher overhead cost than the benefit of silence removal that can be achieved. Another problem is that time stamping each media data stream can be wasteful, especially for uncompressed data streams. For example, if a portion of an audio stream is not compressed, the time stamping of the uncompressed portion of the audio stream results in a further waste of memory resources. Further, if all the data streams are stored with time stamps but the user only desires to listen to the audio portion of the stored multimedia presentation, the user is confined by the time stamp synchronization and is forced to listen to long gaps of silence in the audio portion. Being forced to listen to this silence is thus inefficient and wastes time for the user who is not utilizing the audio with, for example, the synchronized video of the multimedia presentation. A further problem of time stamp synchronization of multimedia presentations is that the time stamps are rendered useless when a multimedia presentation, or a portion thereof, is reused to create a different multimedia presentation. For example, a PowerPoint and video presentation may be prepared by an assistant while a manager may give a final presentation with his own narration over the PowerPoint and video presentation. In this case, time stamp synchronization on the original presentation would not be beneficial for the final multimedia presentation.

Although receiving all the data streams of a multimedia presentation may provide synchronization information, always needing to receive all the streams at once may be wasteful. A receiver may already have one data stream, such as foils from a presentation, but later need the audio. It would be wasteful to download the foils again when the receiver already has them.

Thus, what is needed is an efficient system and method to preserve the timing of the original message, without adding the high overhead of time stamping each packet in the multimedia message. Without the time stamp overhead, the space required to store the multimedia messages or streams would be substantially reduced. It would also be desirable to simplify the storage of multimedia streams by storing the different streams individually and in their native form while providing timing and synchronization information for the purpose of reconstruction of the original multimedia message.

SUMMARY OF THE INVENTION

The present invention relates to a system and method for efficient and automatic synchronization in multimedia presentations. According to an embodiment of the present invention, when a data stream is compressed, delay which would normally be compressed out is replaced by a delay token which indicates a length of time of delay. When the data stream is decompressed and presented, it is optional whether to use or ignore the delay tokens. The delay tokens may be used when data streams are presented together in a multimedia presentation to synchronize the various data streams of the multimedia presentation. Otherwise, when the data streams are presented alone, the delay tokens may be ignored such that data stream delay is simply skipped since there is no need to synchronize with other data streams.

According to an embodiment of the present invention, a method for compressing a data stream is presented. The method includes compressing a data stream that is part of a multimedia presentation. The method also includes stripping a delay from the data stream, and using a delay token in place of the delay in the compressed data stream.

In another embodiment, the present invention provides a method for decompressing a data stream. The method includes decompressing a data stream, and determining if the data stream is part of a multimedia presentation. The method also includes reinserting a delay specified by a delay token if the data stream is part of the multimedia presentation.

In yet another embodiment, the present invention provides a system for compressing a data stream. The system includes a processor configured to compress a data stream that is part of a multimedia presentation, to strip a delay from the data stream, and to use a delay token in place of the delay in the compressed data stream. The system also includes a memory coupled to the processor for storing the compressed data stream.

In yet another embodiment of the invention, a system for decompressing a data stream is presented. The system includes a processor configured to decompress a data stream, to determine if the data stream is part of a multimedia presentation, and to reinsert a delay specified by a delay token if the data stream is part of the multimedia presentation. The system also includes a user interface coupled to the processor for presenting the decompressed data stream.

DETAILED DESCRIPTION OF THE SPECIFIC EMBODIMENTS

The present invention provides an efficient system and method to preserve the timing of the original message, without adding the high overhead of time stamping each packet in the multimedia message. Without the time stamp overhead, the present invention substantially reduces the memory space required to store the multimedia messages or data streams. In addition to simplifying the storage of multimedia streams by storing the different streams individually and in their native form, the present invention also provides timing and synchronization information for the purpose of reconstruction of the original multimedia message. A method and system for automatic synchronization for multimedia presentations is herein disclosed. Software written according to the present invention may be stored in some form of computer-readable medium, such as memory or CD-ROM, or transmitted over a network, and executed by a processor(s). The present invention applies generally to multimedia messaging systems, as well as to video conferencing/multimedia messaging systems over data networks (e.g., H.323 type networks).

Figure 1:
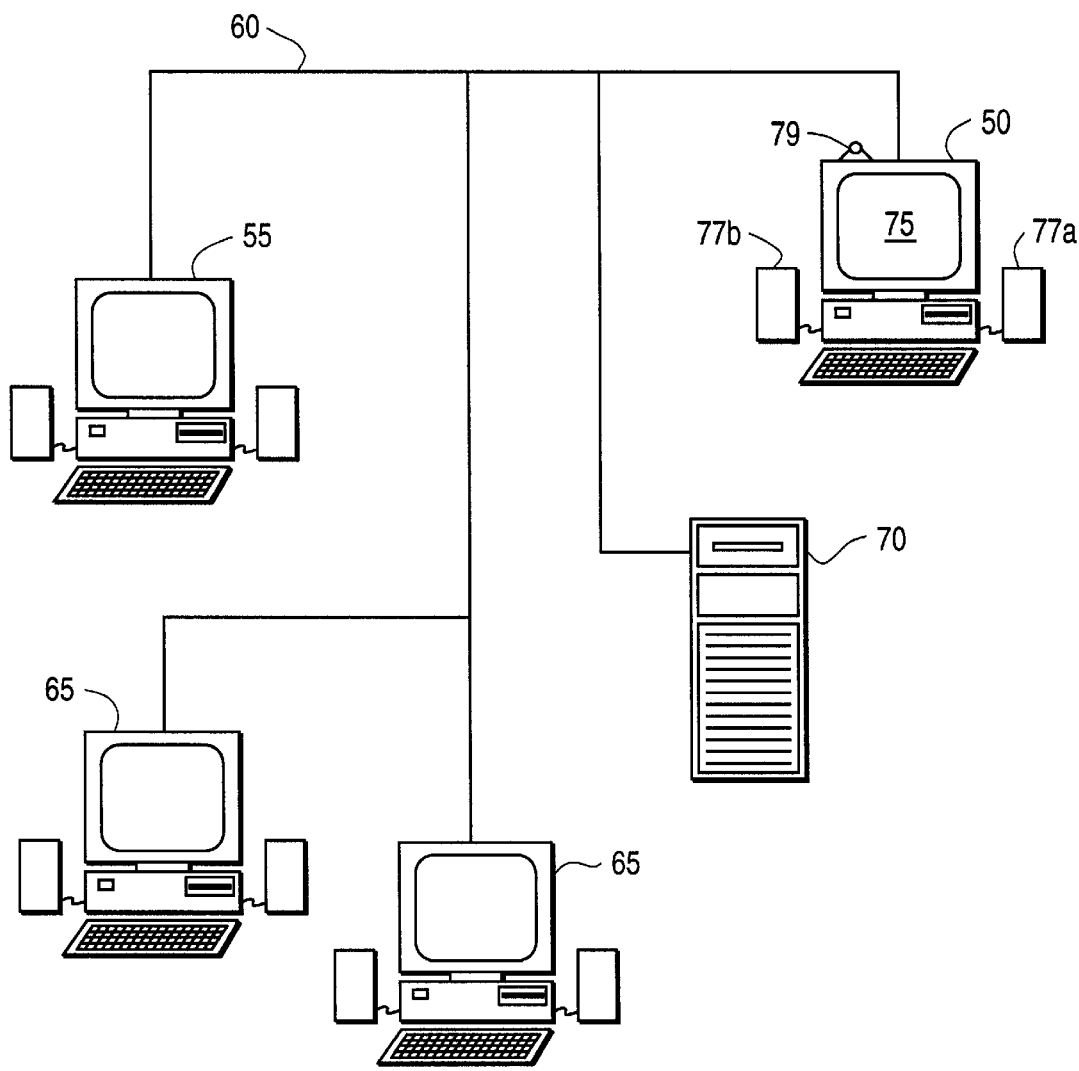
FIG. 1 is a block diagram of a system including at least a sending computer and a receiving computer networked together, this system being suitable for implementing an embodiment of the present invention.

FIG. 1 is a block diagram of an exemplary system including at least a sending computer 50 and a receiving computer 55 networked together, the system being suitable for implementing an embodiment of the present invention. The software for the multimedia messaging system of the present invention may be server-based and/or client-based. Sending computer 50 and receiving computer 55 are networked together via network 60, which also can include other computers 65 and/or a server(s) 70 as shown. Examples of network 60 include a cable network, a local area network (LAN), the Internet, and an intranet. Of course in other embodiments, sending computer 50 and receiving computer 55 may be connected point-to-point. Similar to other computers in network 60, sending computer 50 is shown to include a display 75, a set of speakers 77a–77b, a camera 79, and other equipment such as a mouse (not shown). Sending computer 50 may send a multimedia message to receiving computer 55. A multimedia message may include several data streams. As discussed above, a data stream is herein meant to include a stream of data of a particular media, such as an audio stream, a video stream, a text stream, and an image stream.

Figure 2:
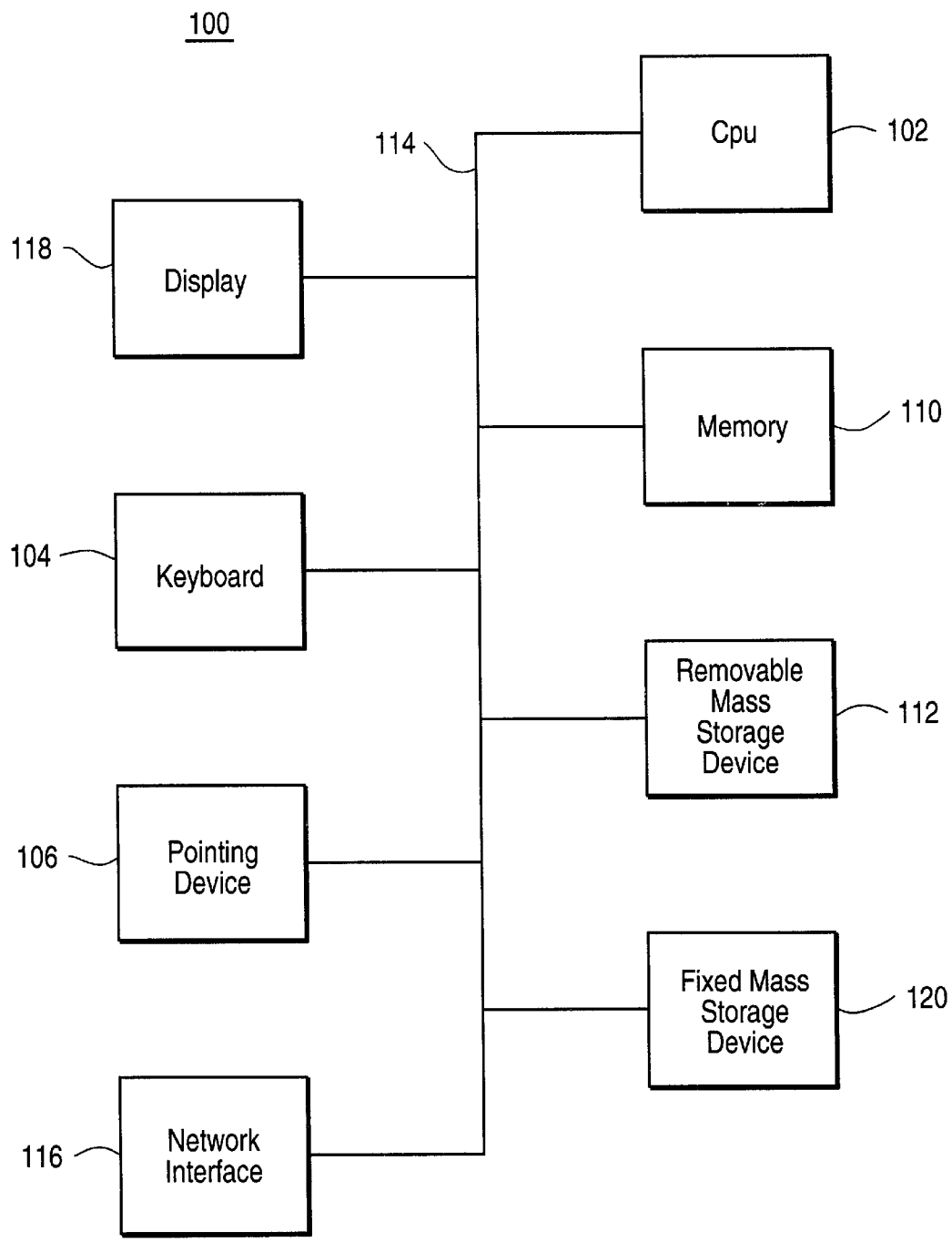
FIG. 2 is a block diagram of a computer system suitable for implementing an embodiment of the present invention.

FIG. 2 is a block diagram of a general-purpose computer system 100 suitable for carrying out the processing in accordance with one embodiment of the present invention. FIG. 2 illustrates one embodiment of a general-purpose computer system that can serve, for example, as sending computer 50 or receiving computer 55. Other computer system architectures and configurations can be used for carrying out the processing of the present invention. Computer system 100, made up of various subsystems described below, includes at least one microprocessor subsystem (also referred to as a central processing unit, or CPU) 102. That is, CPU 102 can be implemented by a single-chip processor or by multiple processors. CPU 102 is a general-purpose digital processor which controls the operation of the computer system 100. Using instructions retrieved from memory 110, the CPU 102 controls the reception and manipulation of input data, and the output and display of data on output devices.

CPU 102 is coupled bi-directionally with memory 110 which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. It can also store programming instructions and data, in the form of data objects and text objects, in addition to other data and instructions for processes operating on CPU 102. Also as well known in the art, primary storage typically includes basic operating instructions, program code, data and objects used by the CPU 102 to perform its functions. Primary storage devices 110 may include any suitable computer-readable storage media, described below, depending on whether, for example, data access needs to be bi-directional or uni-directional. CPU 102 can also directly and very rapidly retrieve and store frequently needed data in a cache memory (not shown).

A removable mass storage device 112 provides additional data storage capacity for the computer system 100, and is coupled either bi-directionally or uni-directionally to CPU 102. For example, a specific removable mass storage device commonly known as a CD-ROM typically passes data uni-directionally to the CPU 102; whereas, a floppy disk typically can pass data bi-directionally to the CPU 102. Storage 112 may also include computer-readable media such as magnetic tape, flash memory, signals embodied on a carrier wave, PC-CARDS, portable mass storage devices, holographic storage devices, and other storage devices. A fixed mass storage 120 can also provide additional data storage capacity. The most common example of mass storage 120 is a hard disk drive. Mass storage 112, 120 generally store additional programming instructions, data, and the like that typically are not in active use by the CPU 102. It will be appreciated that the information retained within mass storage 112, 120 may be incorporated, if needed, in standard fashion as part of primary storage 110 (e.g. RAM) as virtual memory.

In addition to providing CPU 102 access to storage subsystems, bus 114 can be used to provide access other subsystems and devices as well. In the described embodiment, these can include a display monitor 118, a network interface 116, a keyboard 104, and a pointing device 106, as well as an auxiliary input/output device interface, a sound card, speakers, and other subsystems as needed. The pointing device 106 may be a mouse, stylus, track ball, touchpad or tablet, and is useful for interacting with a graphical user interface.

The network interface 116 allows CPU 102 to be coupled to another computer, computer network, or telecommunications network. Through the network interface 116, the CPU 102 might receive information (e.g., data objects or program instructions) from another computer or network, or might output information to another computer or network in the course of performing the above-described method steps. Information, often represented as a sequence of instructions to be executed on a CPU, may be received from and outputted to another computer or network, for example, in the form of a computer data signal embodied in a carrier wave. An interface card or similar device and appropriate software implemented by CPU 102 can be used to connect the computer system 100 to an external computer or network and transfer data according to standard protocols. That is, method embodiments of the present invention may execute solely upon CPU 102, or may be performed across a network such as the Internet, intranet networks, or local area networks, in conjunction with a remote CPU that shares a portion of the processing. Additional mass storage devices (not shown) may also be connected to CPU 102 through network interface 116.

An auxiliary I/O device interface (not shown) can be used in conjunction with computer system 100. The auxiliary I/O device interface can include general and customized interfaces that allow the CPU 102 to send and, more typically, receive data from other devices such as microphones, touch-sensitive displays, transducer card readers, tape readers, voice or handwriting recognizers, biometrics readers, cameras, portable mass storage devices, and other computers.

In addition, embodiments of the present invention further relate to computer storage products with a computer readable medium that contain program code for performing various computer-implemented operations. The computer-readable medium can store data which can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

The computer system shown in FIG. 2 is but an example of a computer system suitable for use with the invention. Other computer systems suitable for use with the invention may include additional or fewer subsystems. In addition, bus 114 is illustrative of any interconnection scheme serving to link the subsystems. Other computer architectures having different configurations of subsystems may also be utilized.

Figure 3:
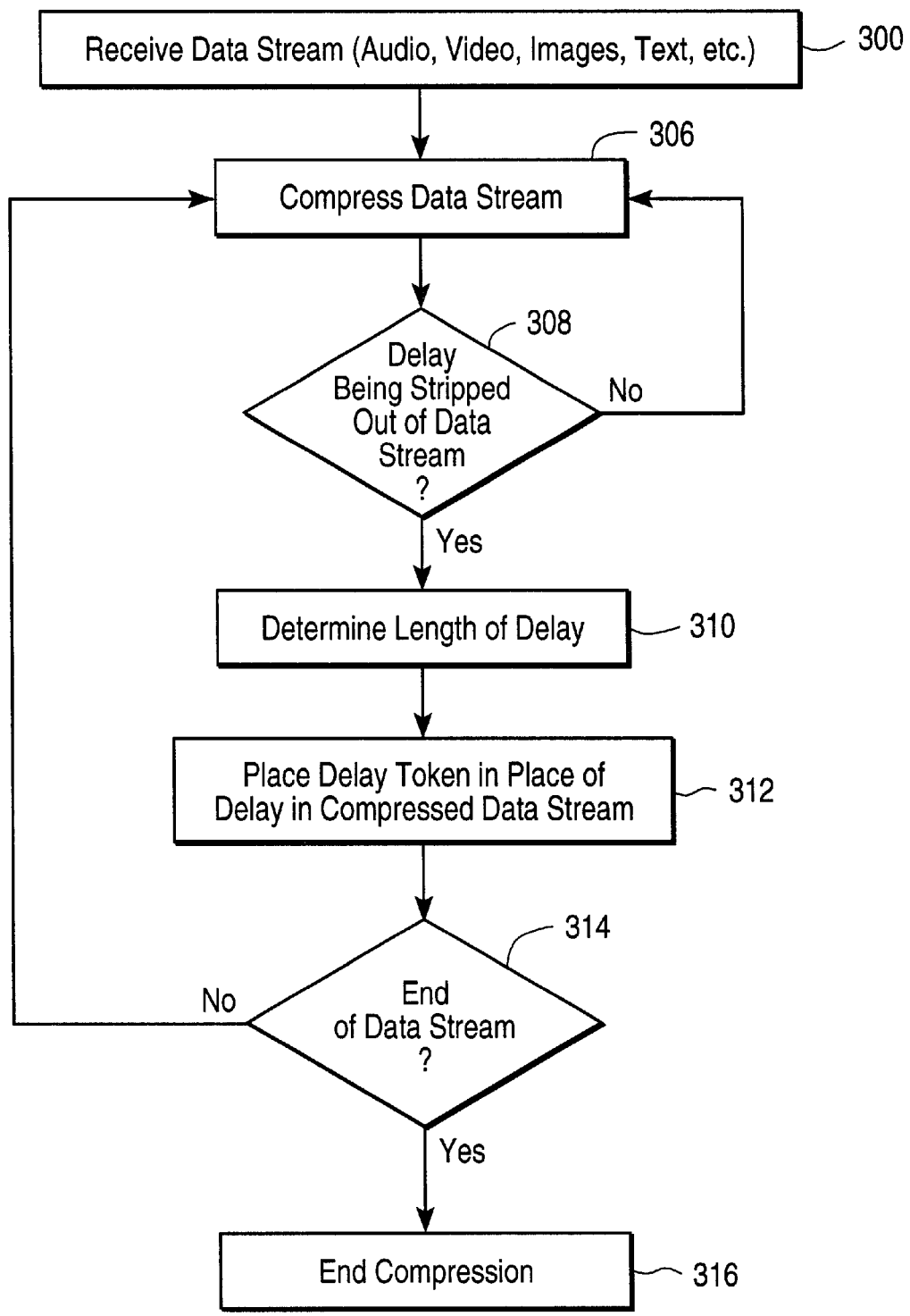
FIG. 3 is a flow diagram of a method according to an embodiment of the present invention for compressing a data stream.

FIG. 3 is a flow diagram of a method for compressing a data stream according to an embodiment of the present invention. A data stream is initially received (step 300). The data stream may be part of a set of data streams for a multimedia presentation or it may be received independently of other data streams. As previously mentioned, examples of data streams include audio, video, images, and text.

The data stream may be received as part of a multimedia presentation, in which case it may be presented together with the other multimedia data streams or independently. Alternatively, although the data stream may have initially been part of a multimedia presentation, the data stream may be received alone, in which case the data stream may be either presented alone, or presented with other data streams. The other data streams may be received independently or may be later created to fit portions of the received data stream. For example, an audio version of a presentation may initially be downloaded, and later a user may decide to download the video version as well to enjoy both the video and audio presentation. Alternatively, an assistant may create a data stream, such as a presentation of pie charts, then send it to a manager who later uses the data stream to create a video narration interspersed with the pie charts.

Compression of the data stream is then initiated (step 306). The data stream compression may be performed by any compression method appropriate for the particular media type of the data stream. Examples of video compression/decompression techniques include run-length coding, Huffman coding, vector quantization, subcolor sampling, DCT, delta frame change, and motion estimation. Examples of audio compression/decompression schemes include ADPCM, MPEG audio compression, GSM, and G.723. Examples of data compression methods include V.42bis and MNP5. While V.42bis and MNP5 work well for real-time compression of a stream of data, a data file, such as a file for a PowerPoint presentation, may be compressed first with an algorithm such as that used in Zip files.

During compression, it is determined whether any delay is being stripped out of the data stream (step 308). It is of course recognized that some compression schemes may automatically strip out any delay from the data stream and that this would thus be recognized by the system. For audio, delay may include a predetermined amount of silence. For video, delay may include repeated identical frames. For images or data, delay (or duration) may include the amount of time each image is displayed or the time during which no new data is presented.

If no delay is being stripped out of the data stream during compression, then compression is continued (step 306). If, however, delay is being stripped out of the data stream, then a length of delay is determined (310). The length of delay for audio may include the time during which silence is compressed out. The length of delay for video may include the number of frames which are being compressed out for redundancy. The length of delay for images or data, may include the time during which no new event is occurring.

Figure 4:
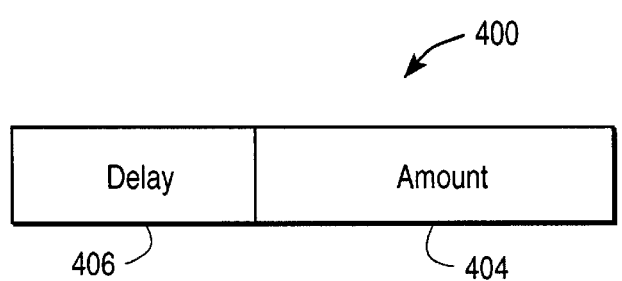
FIG. 4 is a block diagram of a delay token according to an embodiment of the present invention.

A delay token is then placed in place of the delay in the compressed data stream (step 312). An example of a delay token 400, as shown in FIG. 4, is discussed further below. It is then determined whether the data stream has ended (step 314). If the data stream has not yet ended, then the data stream continues to be compressed (step 306). If the data stream has ended, then compression is finished (step 316).

Delay token 400 is included within a packet sent from a sending system to a receiving system. Specifically, delay token 400 may be included in the place of the actual delay which is being compressed out of the data stream. As shown in FIG. 4, delay token 400 includes a delay indicator 406 and a delay amount 404. Delay indicator 406 identifies the token as a delay token, and delay amount 404 indicates the length of the delay in a predetermined unit measure of time. Although delay token 400 may be of any size, the size of delay token 400 is preferably sufficiently small as to provide savings in storage space over conventional methods. For example, an exemplary delay token 400 can be four bytes, with delay 406 being one byte which is a preassigned 8-bit pattern indicating that a delay exists and delay amount 404 being a 24-bit field, such as bytes 2 to 4, indicating the magnitude of the delay in time, such as milliseconds. An advantage of the present invention is seen by way of this example. If there is a multimedia message sent that includes an audio portion having speech followed by a three-second silence gap followed by additional speech, a 4-byte delay token (that indicates the delay amount of 3 seconds) is stored between the first and second portions of speech in the message. In contrast, a conventional voicemail system would probably reduce the three-second gap to a half second to save space in storage. For example, at 32 kilobits per second, this reduction in the stored silence saves about 80 kilobits of storage, with only about 18 kilobits of reduced silence being stored. However, as mentioned earlier, merely removing silence may cause synchronization problems for multimedia messaging. With the exemplary 4-byte delay token of present invention, the 4-byte delay token inserted in place of the actual delay results in a great storage savings (storing only 32 bits), which is a significant improvement over the prior art. In alternative embodiments, delay amount 404 may indicate the length of the delay and also indicate a specific unit measure of time of the delay.

Figure 5:
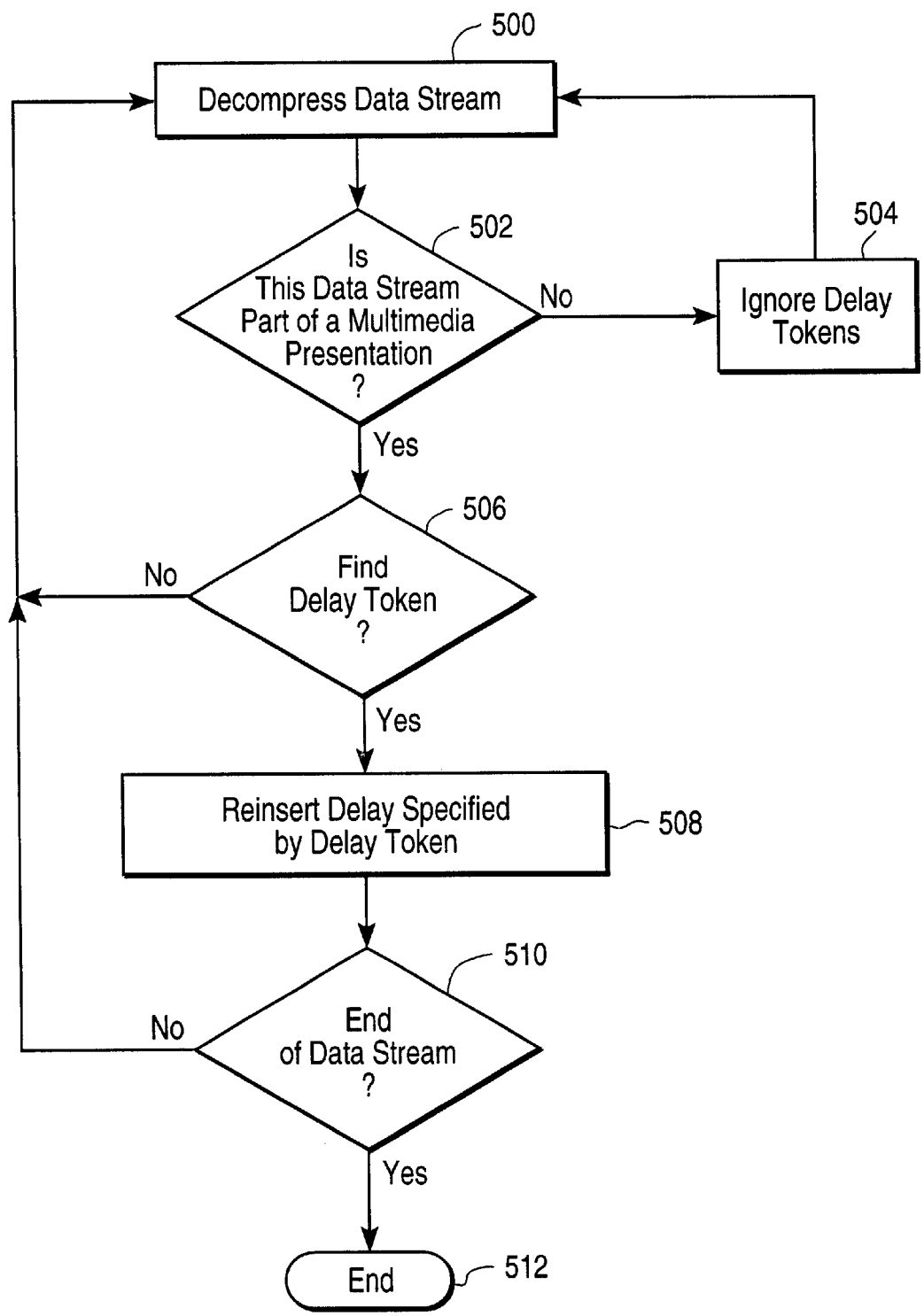
FIG. 5 is a flow diagram of a method according to an embodiment of the present invention for decompressing a data stream.

FIG. 5 is a flow diagram of a method according to an embodiment of the present invention for playback of a compressed data stream, such as the data stream compression illustrated in FIG. 3. Decompression of the data stream is initiated (step 500). Any decompression method, such as the examples discussed in conjunction with FIG. 3, may be used. It is then determined whether this data stream is part of a multimedia presentation (step 502). If this data stream is not being presented as part of a multimedia presentation, then delay tokens are ignored during the decompression (step 504). In this manner, for example, if a user listens to an audio version of a presentation, she does not need to wait during long silences while images are being displayed.

If, however, this data stream is to be part of a multimedia presentation, then it is determined whether a delay token has been found (step 506). If no delay token has been found, then the data stream is continued to be decompressed (step 500). If, however, a delay token is found, then delay specified by the delay token is reinserted into the decompressed data stream (step 508). It is then determined whether the end of the data stream has been reached (step 510). If the end of the data stream has not yet been reached, then the data stream is continued to be decompressed (step 500). If the end of the data stream has been reached, then decompression ends (step 512).

Although the present invention has been described in accordance with the above embodiments, one of ordinary skill in the art will recognize that there could be variations to the embodiments that would be within the spirit and scope of the present invention. Accordingly, some modifications may be made by one of ordinary skill in the art without departing from the spirit and scope of the appended claims.

What is claimed is:

1. A method for compressing two or more multimedia data streams of different media types, comprising:

identifying delays in each of the multimedia data streams;

stripping the delays from the multimedia data streams;

determining lengths of the stripped delays; and inserting delay tokens storing representations of the determined stripped delay lengths in place of the stripped delays in the compressed multimedia data streams, whereby the inserted delay tokens enable synchronization of the multimedia data streams in a multimedia presentation.

2. The method of claim 1, wherein at least one of the multimedia data streams is an audio stream.

3. The method of claim 1, wherein at least one of the multimedia data streams is a video stream.

4. The method of claim 1, wherein at least one of the multimedia data streams represents an image.

5. The method of claim 1, wherein at least one of the multimedia data streams represents text.

6. The method of claim 1, wherein at least one of the delay tokens comprises a delay indicator and a representation of the duration of the stripped delay.

7. The method of claim 1, further comprising storing the compressed multimedia data streams with the delay tokens.

8. A method for decompressing a data stream, comprising:

decompressing a compressed data stream comprising a delay token specifying a delay to produce a decompressed data stream;

determining if the compressed data stream is part of a multimedia presentation; and inserting into the decompressed data stream the delay specified by the delay token in response to a determination that the compressed data stream is part of a multimedia presentation.

9. The method of claim 8, wherein the delay token stores a representation of a length of delay stripped out of an original data stream during production of the compressed data stream.

10. The method of claim 8, further comprising decompressing a second compressed data stream, and synchronizing presentation of the decompressed data streams based at least in part on the delay inserted into the first decompressed data stream.

11. The method of claim 8, wherein the compressed data stream is an audio stream.

12. The method of claim 8, wherein the compressed data stream is a video stream.

13. The method of claim 8, wherein compressed first data stream represents an image.

14. The method of claim 8, wherein the compressed data stream represents text.

15. The method of claim 8, wherein said determining if the data stream is part of multimedia presentation includes determining if a second data stream of the multimedia presentation is present.

16. A method for decompressing a data stream, comprising:

determining if a compressed data stream comprising a delay token specifying a delay is part of a multimedia presentation;

decompressing the compressed data stream to produce a decompressed data stream, wherein the compressed data stream is decompressed without inserting into the decompressed data stream the delay specified by the delay token in response to a determination that the compressed data stream is not part of a multimedia presentation; and inserting into the decompressed data stream the delay specified by the delay token in response to a determination that the compressed data stream is part of a multimedia presentation.

17. A system for compressing two or more multimedia data streams of different media types, comprising:

a processor configured to compress a data stream by identifying delays in each of the multimedia data streams;

stripping the delays from the multimedia data streams;

determining lengths of the stripped delays; and inserting delay tokens storing representations of the determined stripped delay lengths in place of the stripped delays in the compressed multimedia data streams, whereby the inserted delay tokens enable synchronization of the multimedia data streams in a multimedia presentation; and a memory coupled to the processor for storing the compressed multimedia data streams.

18. The system of claim 17, wherein at least one of the delay tokens comprises a delay indicator and a representation of the duration of the stripped delay.

19. A system for decompressing a data stream, the system comprising:

a processor configured to decompress a data stream comprising a delay token specifying a delay to produce a decompressed data stream by determining if the compressed data stream is part of a multimedia presentation, and inserting into the decompressed data stream the delay specified by the delay token in response to a determination that the compressed data stream is part of a multimedia presentation; and user interface coupled to the processor for presenting the decompressed data stream.

20. The system of claim 19, wherein the processor is configured to decompress a second compressed data stream, and synchronize presentation of the decompressed data streams based at least in part on the delay inserted into the first decompressed data stream.

21. A system for decompressing a data stream, the system comprising:

a processor configured to decompress a data stream comprising a delay token specifying a delay to produce a decompressed data stream by determining if the compressed data stream is part of a multimedia presentation, and inserting into the decompressed data stream the delay specified by the delay token in response to a determination that the compressed data stream is part of a multimedia presentation, wherein the compressed data stream is decompressed without inserting into the decompressed data stream the delay specified by delay token in response to a determination that the compressed data stream is not part of a multimedia presentation; and user interface coupled to the processor for presenting the decompressed data stream.

22. A computer program for compressing two or more multimedia data streams of different media types, the computer program residing on a computer-readable medium and comprising computer-readable instructions for causing a computer to:

identify delays in each of the multimedia data streams;

strip the delays from the multimedia data streams;

determine lengths of the stripped delays; and insert delay tokens storing representations of the determined stripped delay lengths in place of the stripped delays in the compressed multimedia data streams, whereby the inserted delay tokens enable synchronization of the multimedia data streams in a multimedia presentation.

23. The computer program of claim 22, wherein at least one of the delay tokens comprises a delay indicator and a representation of the duration of the stripped delay.

24. A computer program for decompressing a data stream, the computer program residing on a computer-readable medium and comprising computer-readable instructions for causing a computer to:

decompress a compressed data stream comprising a delay token specifying a delay to produce a decompressed data stream;

determine if the compressed data stream is part of a multimedia presentation; and insert into the decompressed data stream the delay specified by the delay token in response to a determination that the compressed data stream is part of a multimedia presentation.

25. A computer program for decompressing a data stream, the computer program residing on a computer-readable medium and comprising computer-readable instructions for causing a computer to:

determine if a compressed data stream comprising a delay token specifying a delay is part of a multimedia presentation;

decompress the compressed data stream to produce a decompressed data stream; and insert into the decompressed data stream the delay specified by the delay token in response to a determination that the compressed data stream is part of a multimedia presentation, wherein the compressed data stream is decompressed without inserting into the decompressed data stream the delay specified by the delay token in response to a determination that the compressed data stream is not part of a multimedia presentation.

* * * * *